United States Patent
Sun et al.

(10) Patent No.: US 11,472,923 B2
(45) Date of Patent: Oct. 18, 2022

(54) NANOPARTICLE CATALYST FOR SYNTHESIZING POLYBENZOXAZOLE WITH CONTROLLED POLYMERIZATION

(71) Applicant: Brown University, Providence, RI (US)

(72) Inventors: Shouheng Sun, East Greenwich, RI (US); Chao Yu, Providence, RI (US); Xuefeng Guo, Providence, RI (US); Christopher Seto, Barrington, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 17/598,011

(22) PCT Filed: Mar. 24, 2020

(86) PCT No.: PCT/US2020/024498
§ 371 (c)(1),
(2) Date: Sep. 24, 2021

(87) PCT Pub. No.: WO2020/198247
PCT Pub. Date: Oct. 1, 2020

(65) Prior Publication Data
US 2022/0162389 A1 May 26, 2022

Related U.S. Application Data

(60) Provisional application No. 62/823,386, filed on Mar. 25, 2019.

(51) Int. Cl.
*C08G 73/22* (2006.01)
*B01J 35/02* (2006.01)
(Continued)

(52) U.S. Cl.
CPC .............. *C08G 73/22* (2013.01); *B01J 23/66* (2013.01); *B01J 35/0013* (2013.01); *B01J 35/023* (2013.01)

(58) Field of Classification Search
CPC ...... B01J 23/66; B01J 35/0013; B01J 35/023; B01J 23/44; B01J 23/52; C22C 5/02; C22C 5/04; C08G 73/22
(Continued)

(56) References Cited

U.S. PATENT DOCUMENTS 3,376,257 A * 4/1968 Nakanishi .............. C08G 73/22
528/343
3,763,107 A * 10/1973 D'Alelio ................ C08G 73/18
528/253
(Continued)

FOREIGN PATENT DOCUMENTS

CN 104307515 B 6/2016
CN 104140528 B 1/2017
(Continued)

OTHER PUBLICATIONS

Rubio-Cervilla et al., "Advances in Single-Chain Nanoparticles for Catalysis Applications", Nanomaterials, vol. 7, Issue 10, 20 pages, Oct. 21, 2017.
(Continued)

*Primary Examiner* — Patricia L. Hailey
(74) *Attorney, Agent, or Firm* — Adler Pollock & Sheehan P.C.

(57) ABSTRACT

The present invention provides a process of using an alloy nanoparticle catalyst to catalyze one pot chemical reactions for synthesizing functional polymers with controlled polymerization and properties. In particular, the present invention provides a process of using an AuPd NP catalyst to catalyze one pot chemical reactions for synthesizing polybenzoxazole with controlled polymerization and improved chemical stability.

15 Claims, 9 Drawing Sheets

A new synthetic route for producing PBO

(51) Int. Cl.
    *B01J 35/00*    (2006.01)
    *B01J 23/66*    (2006.01)
(58) Field of Classification Search
    USPC .................................. 502/339; 420/463, 508
    See application file for complete search history.

(56) References Cited

U.S. PATENT DOCUMENTS

| | | | | |
|---|---|---|---|---|
| 3,764,581 | A | * | 10/1973 | Zellner .................. C08G 73/22 |
| | | | | 556/418 |
| 3,772,309 | A | * | 11/1973 | Marvel ................ C07D 263/57 |
| | | | | 528/149 |
| 4,892,921 | A | | 1/1990 | Tsai et al. |
| 9,214,692 | B2 | | 12/2015 | Kim et al. |
| 2003/0143480 | A1 | * | 7/2003 | Ueda .................. H01L 23/49894 |
| | | | | 430/326 |
| 2013/0324662 | A1 | * | 12/2013 | Honda .................. C09D 179/04 |
| | | | | 525/437 |
| 2015/0337084 | A1 | * | 11/2015 | Noda ...................... C08G 73/22 |
| | | | | 528/243 |
| 2016/0039008 | A1 | * | 2/2016 | Humphrey ................ C22C 5/06 |
| | | | | 420/463 |
| 2017/0240706 | A1 | | 8/2017 | Wetzel et al. |

FOREIGN PATENT DOCUMENTS

| | | | | |
|---|---|---|---|---|
| GB | 1142071 | A | | 2/1969 |
| JP | 01-256534 | | * | 10/1989 ............. C08G 73/08 |
| JP | H01256534 | A | | 10/1989 |
| JP | 2007-161948 | | * | 6/2007 ........... C07C 201/12 |
| JP | 2007161948 | A | | 6/2007 |
| WO | WO-8900556 | A1 | * | 1/1989 ............. C07C 91/42 |

OTHER PUBLICATIONS

So et al., "Study of the Mechanism for Poly(p-phenylene)benzoxazole Polymerization A Remarkable Reaction Pathway to Make Rigid-Rod Polymers", Macromolecules, vol. 31, Issue 16, pp. 5229-5239, Aug. 1, 1998 (English Abstact submitted).
Teimouri et al., "An efficient and one-pot synthesis of benzimidazoles, benzoxazoles, benzothiazoles and quinoxalines catalyzed via nano-solid acid catalysts", Journal of Molecular Catalysis A: Chemical, vol. 373, Issue 13, pp. 38-45, Mar. 14, 2013.
Yu et al., "AgPd Nanoparticles Deposited on WO2.72 Nanorods as an Efficient Catalyst for One-Pot Conversion of Nitrophenol/Nitroacetophenone into Benzoxazole/Quinazoline", Journal of the American Chemical Society, vol. 129, pp. 5712-5715, Apr. 12, 2017.
Yu et al., "Highly Efficient AuPd Catalyst for Synthesizing Polybenzoxazole with Controlled Polymerization", Matter, vol. 1, pp. 1631-1641, Dec. 4, 2019.
International Search Report and Written Opinion received in PCT application No. PCT/US2020/024498 dated Jun. 15, 2020, 8 pages.
Chao Yu et al., "Highly Efficient AuPd Catalyst for Synthesizing Polybenzoxazole with Controlled Polymerization", Matter, vol. 1, Issue 6, 2019, pp. 1631-1643, ISSN 2590-2385, https://doi.org/10.1016/j.matt.2019.09.001.
Mengqi Shen et al., "Nanoparticle-Catalyzed Green Chemistry Synthesis of Polybenzoxazole," Journal of the American Chemical Society 2021 143 (4), 2115-2122; DOI: 10.1021/jacs.0c12488.
Huanqin Guan et al., Cu2O nanoparticle-catalyzed tandem reactions for the synthesis of robust polybenzoxazole Royal Society of Chemistry, 2022.

* cited by examiner

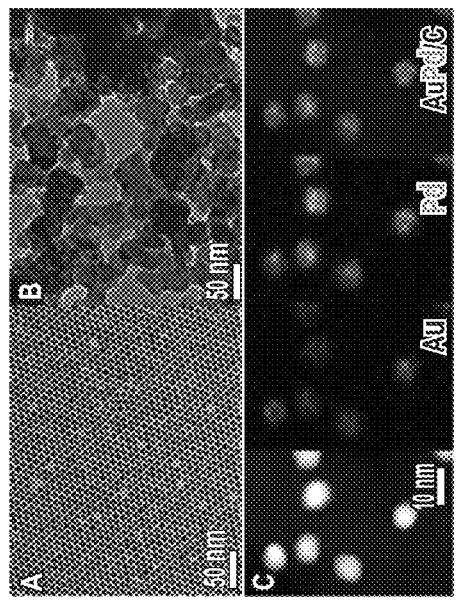
FIGS 1A, 1B, and 1C: Preparation and characterization of AuPd alloy NPs. (A) TEM image of 8.2±0.4 nm $Au_{39}Pd_{61}$ NPs deposited on C. (C) HAADF-STEM image of the $Au_{39}Pd_{61}$/C and elemental mapping of NPs to show Au (red) and Pd (green) distribution within the NPs.
FIGS 1A, 1B, and 1C

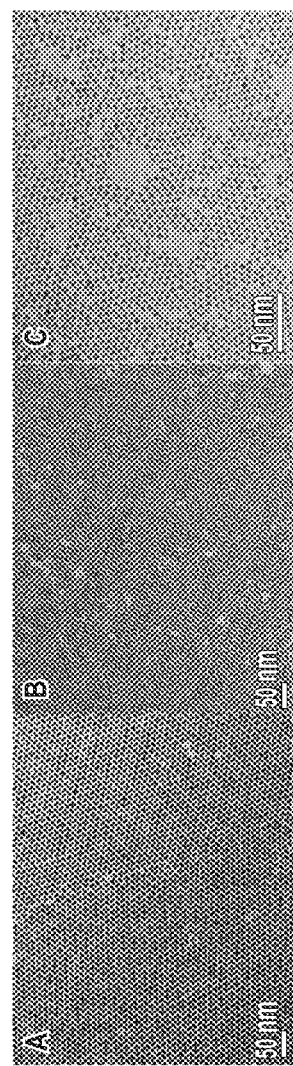
FIGS S2A-C: TEM images of Au NPs. (A) 10 nm. (B) 6 nm. (C) 4 nm.
FIGS S2A-C

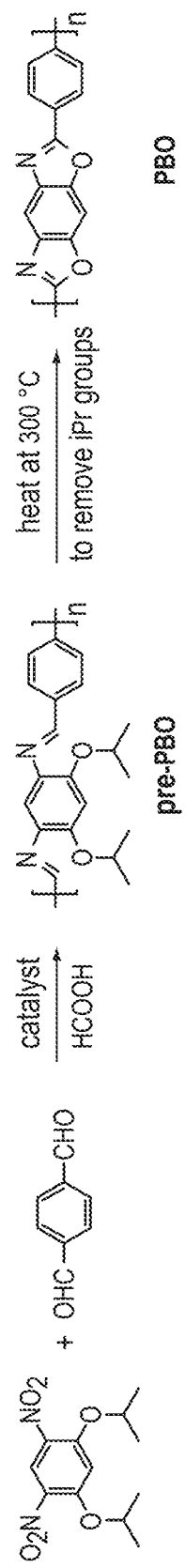
FIG 3: A new synthetic route for producing PBO

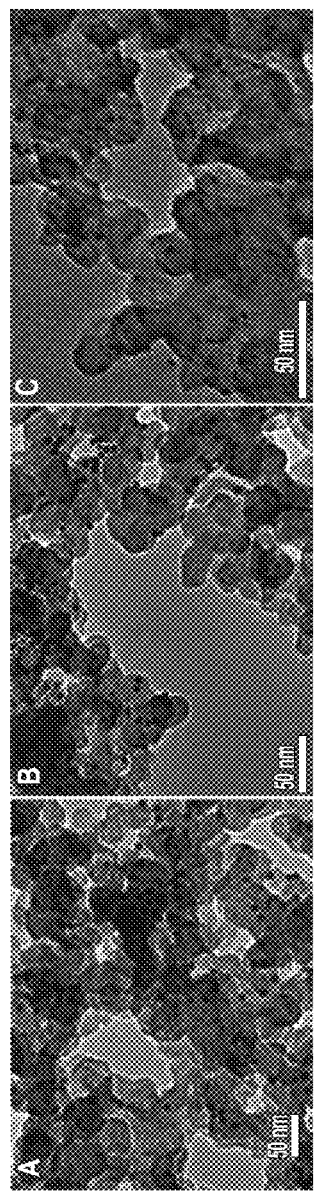
FIGS S3A-C: TEM images of $Au_{39}Pd_{61}/C$ with different NP sizes. (A) 10.5±0.2 nm. (B) 6.4±0.3 nm. (C) 4.3±0.2 nm.
FIGS S3A-C

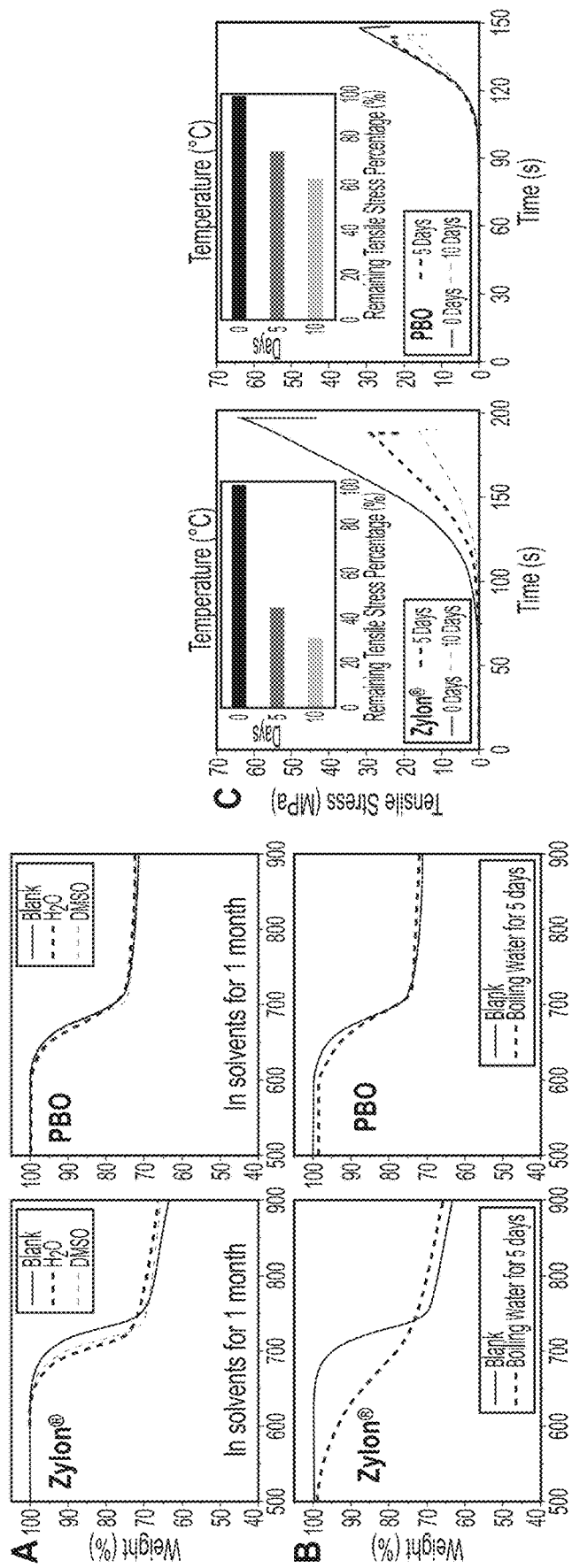

FIGS 4A-C: The thermal stability and mechanical properties of the as-prepared PBO. (A) TGA data for Zylon® and PBO after immersing in H2O or DMSO at ambient temperature for 1 month. (B) TGA data for Zylon® and PBO after immersing in boiling water for 5 days. (C) Tensile strength of Zylon® and PBO as a function of time at a rate of 0.1 mm/min before and after immersing in boiling water for 5 days and 10 days, inset: the remaining tensile stress versus the pristine tensile strength of samples.

FIGS 4A-C

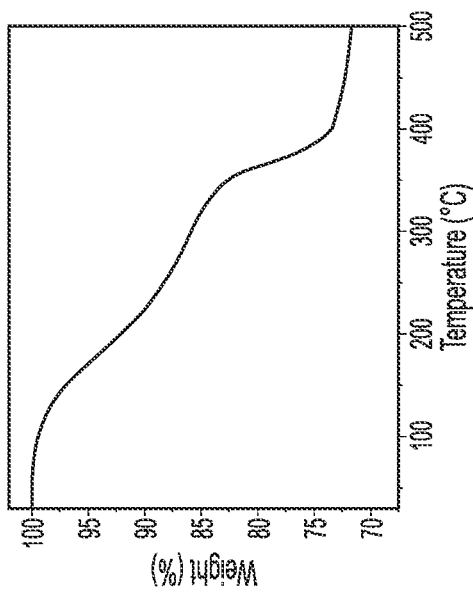
FIG S5: TGA data of pre-PBO prepared from one-pot reaction catalyzed by 8 nm $Au_{39}Pd_{61}/C$.
FIG S5

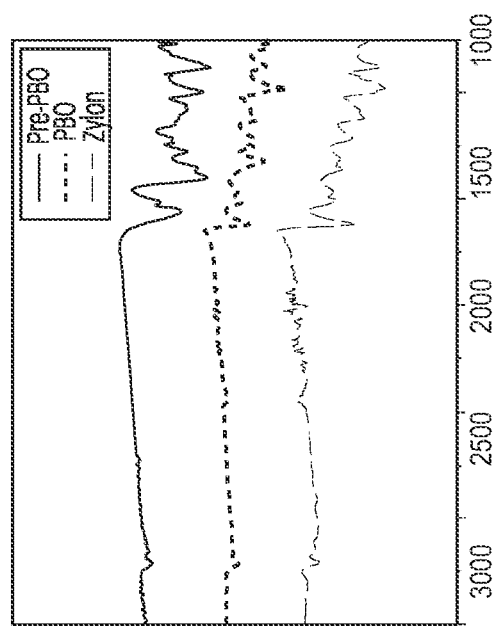
FIG S6: FT-IR spectra of Pre-PBO, PBO and Zylon®
FIG S6

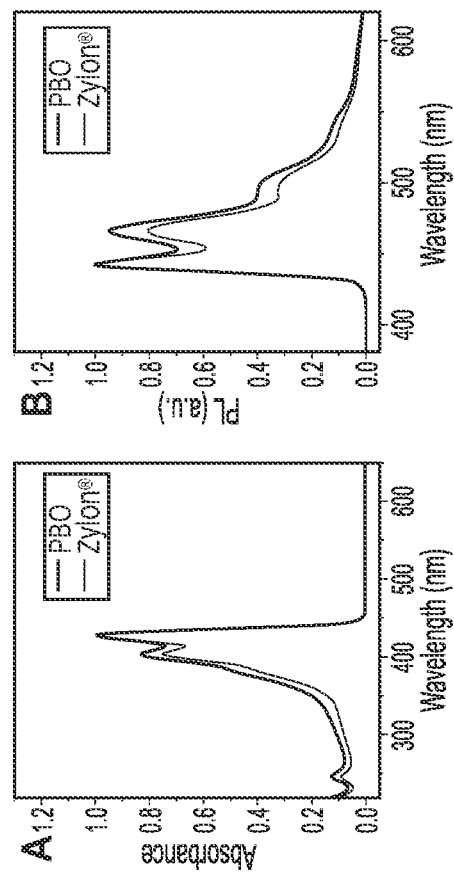
FIGS S7A-B: show the absorption spectra (A), and PL spectra (B) of PBO and Zylon® in methane sulfonic acid ($7 \times 10^{-6}$ g/mL)
FIGS S7A-B

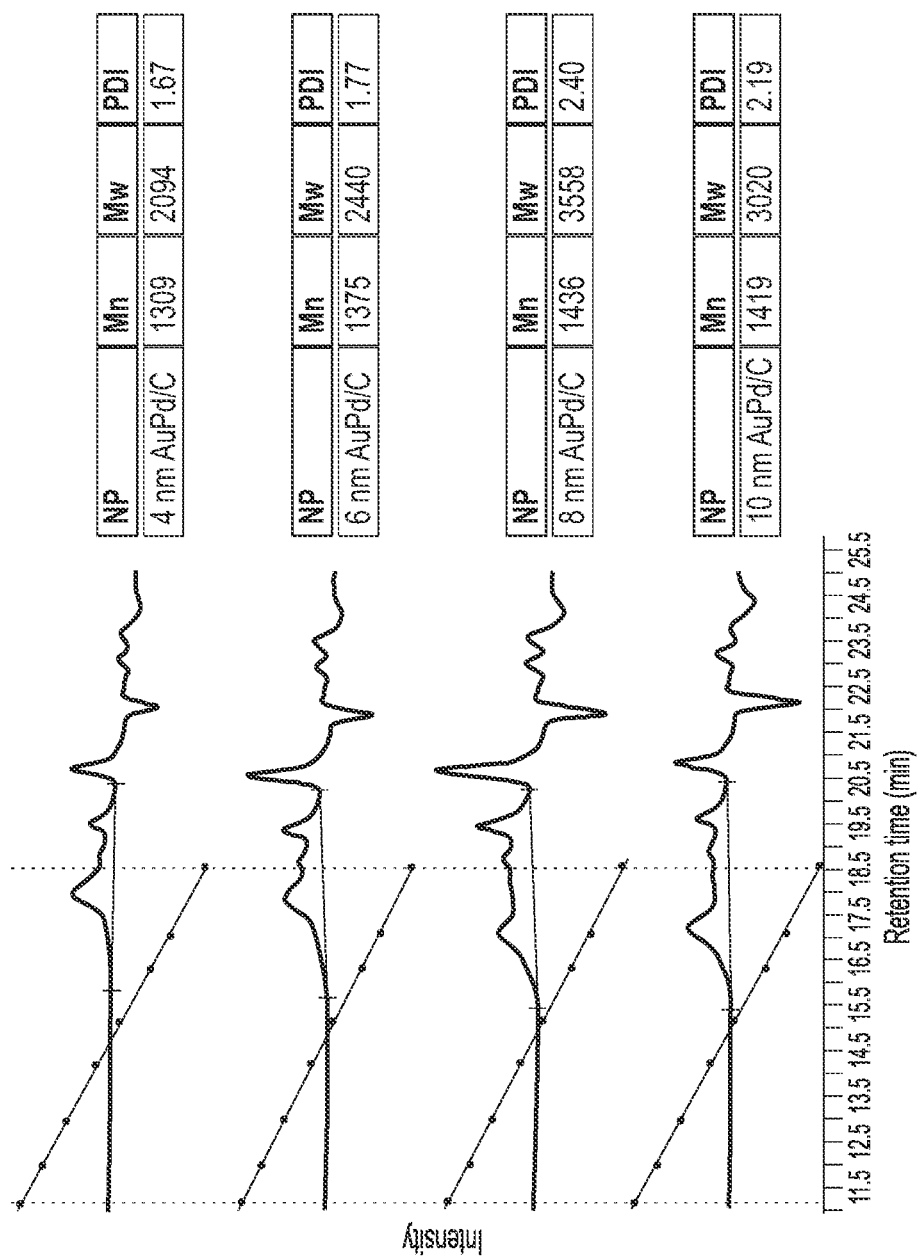
FIG S8: The GPC chromatograms of pre-PBOs formed using AuPd NPs with varying nanoparticle sizes

NANOPARTICLE CATALYST FOR SYNTHESIZING POLYBENZOXAZOLE WITH CONTROLLED POLYMERIZATION

CROSS-REFERENCE TO RELATED PATENT APPLICATIONS

This application is a national phase filing under 35 U.S.C. § 371 of International Application No. PCT/US2020/024498 filed Mar. 24, 2020, which claims priority from U.S. Provisional Patent Application No. 62/823,386 filed Mar. 25, 2019, the contents of which are incorporated herein in their entirety.

FIELD OF THE INVENTION

The instant invention relates generally to highly efficient AuPd nanoparticle (NP) catalyst for synthesizing polybenzoxazole with controlled polymerization.

STATEMENT REGARDING FEDERALLY SPONSORED RESEARCH OR DEVELOPMENT

This invention was not made with government support or grant(s).

BACKGROUND OF THE INVENTION

Polybenzoxazole (PBO) polymer is a sub-class of polybenzoazoles. The highly aromatic nature and conjugated structure of alternating benzoxazole and phenyl rings provides the PBO polymer with superior thermal and mechanical stability characteristics. These characteristics make PBO fibers desirable candidates for use in body armor, flame retardant materials, smart electronic textiles, and ionic/separation membranes.

Conventionally, PBOs were made by condensing diaminobenzene diol and terephthalic acid with polyphosphoric acid, which serves both as solvent and catalyst. Use of phosohoric acid results in the PBOs being contaminated with phosphoric acid (PA) units. One such disclosure is by Ying-Hung So et al in *Macromolecules* 1998, 31, 16, 5229-5239 which discloses the mechanism of poly(p-phenylenebenzoxazole) formation from terephthalic acid (TA) and diaminodihydroxybenzene dihydrochloride (DADHB) in polyphosphoric acid (PPA).

Extensive studies on PBO stability have revealed that these PA units catalytically hydrolyze the benzoxazole ring upon exposure to humid and/or lighted environments, thereby causing unexpected and fast degradation of the mechanical integrity of the polymer fibers. There is thus a need for a method to make PBOs with functional polymers with controlled polymerization, purity and properties to afford PBOs that maintain their thermomechanical stability and do undergo degradation of the mechanical integrity of its polymers upon exposure to humid and lighted environments.

SUMMARY OF THE INVENTION

The instant invention provides new nanoparticle (NP) based catalytic approach to synthesize functional polymers with controlled polymerization, purity and properties. Using the rigid organic polymer PBO as a desired model system, we have demonstrated that AuPd alloy NPs are especially efficient catalyzing multiple chemical reactions in one-pot, including formic acid (FA) dehydrogenation, nitro-hydrogenation and amine/aldehyde condensation, to form PBO.

The PBO shows excellent thermal stability up to 600° C., which is comparable to commercial PBO (Zylon®, $M_w$=40 kDa). More importantly, our PBO exhibits improved chemical and mechanical stability compared to Zylon® after exposure to water and DMSO under either ambient or boiling conditions. Our new synthesis thus addresses the long-standing PBO purity and degradation problems by demonstrating that the AuPd NP catalyzed one-pot reaction can yield highly pure PBO. Chemical purity, especially devoid of PA units helps PBO to maintain its thermomechanical stability.

The present invention in one of its embodiment provides a process of using a NP catalyst alloy to catalyze a one pot chemical reaction for synthesizing functional polymers with controlled polymerization and properties, said process comprising: (a) contacting, in a neutral atmosphere, a solution of 1,5-diisopropoxy-2,4-dinitrobenzene with terephthalaldehyde, formic acid, and an alloy NP catalyst to form a mixture; (b) stirring said mixture at an elevated temperature ranging from about 60 to 90° C. for about 20 to 24 h; (c) forming a precipitate by mixing said stirred solution with methanol; (d) collecting said precipitate, in the form of a solid, and washing said collected precipitate with methanol; (e) subjecting said collected precipitate to an atmosphere of reduced pressure from about 20 hours to about 30 hours at a temperature of from about 60° C. to 90° C. to yield a pre-PBO as a dark colored powder, and (f) heating said pre-PBO at a temperature of about 250° C. to about 350° C. in an inert atmosphere from about 5 hours to about 7 hours to yield PBO.

A preferred embodiment provides a process wherein the neutral atmosphere consists of a gas that is not capable of participating in or affecting the outcome of the one-pot chemical reaction. Yet another preferred embodiment provides a process wherein the NP catalyst is an AuPd NP system. Also provided in another preferred embodiment is a process wherein the neutral atmosphere essentially consists of an inert gas selected from, for example, nitrogen or argon, and the NP catalyst is an AuPd/C NP alloy consisting an AuPd NP catalyst on a carbon support.

Provided in other preferred embodiments is a process wherein the AuPd catalyst particle size is selected from about 4, 6, 8 and 10 nm, with 8 nm being the preferred particle size for said process. Yet other preferred embodiment provides a process wherein said mixture is stirred for 24 hours at about 80° C. Yet another preferred process provides a process wherein said collected precipitate is subjected to an atmosphere of reduced pressure for about 24 hours at a temperature of about 80° C. to yield a pre-PBO as a dark colored powder. A further preferred embodiment provides a process wherein the pre-PBO is heated in an annealing oven at a temperature of about 300° C. in an inert (for example nitrogen) atmosphere for about 6 hours to yield PBO.

A particularly preferred embodiment of this aspect of the invention provides a process of using an AuPd NPNP catalyst to catalyze one pot chemical reactions for synthesizing functional polymers with controlled polymerization and properties, said process comprising: (a) contacting, in a nitrogen atmosphere, a solution of 1,5-diisopropoxy-2,4-dinitrobenzene with terephthalaldehyde, formic acid, and a NP catalyst to form a mixture; (b) stirring said mixture at about 80° C. for about 24 hours; (c) forming a precipitate by mixing said stirred solution with methanol; (d) collecting said precipitate, in the form of a solid, and washing said collected precipitate with methanol; (e) subjecting said collected precipitate to an atmosphere of reduced pressure for about 24 hours at a temperature of about 80° C. to yield a pre-PBO as a dark colored powder, and (f) heating said pre-PBO at about 300° C. in an annealing oven under a Nitrogen atmosphere for about 6 hours to yield PBO.

Another aspect of the instant invention provides an alloy NP system capable of catalyzing a one pot chemical reaction for synthesizing functional polymers with controlled polymerization and properties. A preferred embodiment provides a NP system wherein the NP system is a catalytically active AuPd/C NP alloy consisting an AuPd NP catalyst on a carbon support. A further preferred embodiment of this aspect of the invention provides an NPAuPd/C having a particle size of between about 4 and about 10 nm, with the particle size of between 6 and 8 nm being preferred and the particularly preferred particle size being about 8 nm.

BRIEF DESCRIPTION OF THE DRAWINGS

FIGS. 1A, 1B, and 1C: show representative TEM images of 8 nm Au seeding NPs (FIG. 1A) and 8.2±0.4 nm AuPd/C (FIG. 1B); and FIG. 1C shows the alloy structure of the NPs using elemental mapping.

FIGS. S2A-C: depict TEM images of 10, 6, and 4 Au NPs respectively are given in FIGS. S2A-C.

FIG. 3: This figure shows schematic wherein 8 nm $Au_{39}Pd_{61}$/C (2.5 mol %) was used to catalyze FA-induced reduction of 1,5-diisopropoxy-2,4-dinitrobenzene and subsequent condensation with terephthalaldehyde in NMP to form poly(p-phenylene-(4,6-diisopropoxy-1,3-phenylene) diethanimine), denoted as pre-PBO.

FIGS. S3A-C: depict TEM images of 10, 6, and 4 AuPd NPs respectively are given in FIGS. S3A-C.

FIGS. 4A-C: depict the stability comparison of the PBO synthesized using the instant invention and Zylon®.

FIG. S5: shows the thermal gravimetric analysis (TGA) under a $N_2$ atmosphere of the weight loss of the pre-PBO.

FIG. S6: shows the IR spectra of the newly prepared pre-PBO and PBO.

FIGS. S7A-B: show UV-Vis absorption spectra (FIG. S7A) and PL spectra (FIG. S7B) of PBO and Zylon® in methane sulfonic acid ($7 \times 10^{-6}$ g/mL).

FIG. S8: shows GPC chromatograms of pre-PBOs formed using AuPd NPs with varying NP sizes.

EXAMPLES

Materials

All reagents were used as received from commercial sources. 1,5-Difluoro-2,4 dinitrobenzene (97%) was purchased from TCI. Oleylamine (OAm, >70%), 1,2,3,4-tetrahydronaphthalene (tetralin), 1-octadecene (ODE, technical grade, 90%), oleic acid (OA, 90%), borane tert-butylamine complex powder (BBA, 70%), silver(II) acetylacetonate ($Ag(acac)_2$) (98%), potassium carbonate (99%), 2-propanol (99.5%), hexadecanediol (90%), terephthalaldehyde (99%), and formic acid (90%) were from Sigma-Aldrich. Platinum (II) acetylacetonate ($Pt(acac)_2$) (98%), palladium (II) acetylacetonate ($Pd(acac)_2$) (99%), hydrogen tetrachloroaurate (III) hydrate ($HAuCl_4 \cdot 3H_2O$) (98%), were from Strem Chemicals. Hexane (98.5%), isopropanol (100%), ethanol (100%) and acetic acid (98%) were purchased from Fisher Scientific. Single layer graphene oxide was purchased from Graphene Supermarket. These chemicals were used without further purification. The deionized water was obtained from a Millipore Autopure System.

Synthesis of 4 nm Au NPs 0.2 g $HAuCl_4$ was dissolved in 10 mL of tetralin and 10 mL of OAm at 4° C. under Ar flow and vigorous magnetic stirring. 0.5 mmol of BBA was dissolved in 1 mL of tetralin and 1 mL of OAm via sonication. The solution was then injected into the $HAuCl_4$ solution. The mixed solution was then stirred for 1 h at 45° C. before 40 mL of acetone was added to collect Au NPs via centrifugation (8500 rpm, 8 min). The product was dispersed in 20 mL hexane, precipitated out by adding 40 mL of ethanol and centrifugation, and re-dispersed in hexane.

Synthesis of 6 nm Au NPs 0.2 g $HAuCl_4$ was dissolved in 10 mL of tetralin and 10 mL of OAm at 4° C. under Ar flow and vigorous magnetic stirring. 0.5 mmol of BBA was dissolved in 1 mL of tetralin and 1 mL of OAm via sonication. The solution was then injected into the $HAuCl_4$ solution. The mixed solution was then stirred for 1 h at 4° C. before 40 mL of acetone was added to collect Au NPs via centrifugation (8500 rpm, 8 min). The product was dispersed in 20 mL hexane, precipitated out by adding 40 mL of ethanol and centrifugation, and re-dispersed in hexane.

Synthesis of 8 nm Au NPs 30 mg of 6 nm Au NPs was added to a solution made from 10 mL ODE, 10 mL OAm and 0.1 g $HAuCl_4$ at room temperature under Ar flow and vigorous magnetic stirring. The reaction solution was then heated to 80° C. at 5° C./min and kept at this temperature for 2 h. The reaction solution was cooled down to room temperature and the 8 nm Au NP product was separated as described in the synthesis of 6 nm Au NPs.

Synthesis of 10 nm Au NPs 30 mg of 8 nm Au NPs was added to a solution made from 10 mL ODE, 10 mL OAm and 0.12 g $HAuCl_4$ at room temperature under Ar flow and vigorous magnetic stirring. The reaction solution was then heated to 80° C. at 5° C./min and kept at this temperature for 2 h. The reaction solution was cooled down to room temperature and the 8 nm Au NP product was separated as described in the synthesis of 6 nm Au NPs.

Seed-mediated synthesis of $Au_{39}Pd_{61}$/C from 4 to 10 nm 76 mg of $Pd(acac)_2$, 15 mL OAm, and 0.30 mL OAc were mixed under $N_2$ at 70° C. for 30 min to form a clear solution. Then 18 mg of Au NP seeds from 4 to 10 nm dispersed in 2 mL hexane was dropped into the solution. The solution was heated to 260° C. at 2° C./min and kept at 260° C. for 1 h before it was cooled to room temperature. The $Au_{39}Pd_{61}$ NPs were separated by adding 100 mL ethanol and centrifuging at 9500 rpm for 8 min. The product was purified by dispersing in hexane and flocculating with ethanol, and precipitating by centrifugation (9500 rpm, 8 min). The purification process was repeated once, and the final NP product was redispersed into hexane for further use. 10 mg of $Au_{39}Pd_{61}$ NPs were dissolved in hexane in a 100 mL vial and 100 mg of Ketjen carbon support was carefully added to it. This colloidal mixture was sonicated for 2 h. The reaction mixture was then cooled down to room temperature. 120 mL of ethanol was added, and the mixture was centrifuged at 8000 rpm for 8 mins. This procedure was repeated twice. The $Au_{39}Pd_{61}$/C NPs were recovered by adding acetone. Acetone was evaporated and the resultant $Au_{39}Pd_{61}$/C NPs were weighed, followed by annealing under 95% Ar+5% $H_2$ at 500° C. for 10 mins, which gave $Au_{39}Pd_{61}$/C NPs with different sizes for further study.

Synthesis of 1,5-diisopropoxy-2,4-dinitrobenzene

To a mixture of potassium carbonate (5.5 g, 40 mmol) and 2-propanol (40 mL), 1,5-difluoro-2,4 dinitrobenzene (2.04 g, 10 mmol) was added while stirring under nitrogen. After reacting for 2 days at room temperature, a generated precipitate was filtered and then rinsed several times with water. The obtained solid was dried at 80° C. for 12 h in a vacuum to provide a yellow powder (2.243 g, 79%).

Synthesis of pre-PBO

Under a nitrogen atmosphere, 1,5-diisopropoxy-2,4-dinitrobenzene (0.284 g, 1.0 mmol) was dissolved in NMP (3 mL), to which terephthalaldehyde (0.134 g, 1.0 mmol), formic acid (10 mmol) and AuPd/C (30 mg, 7%) were added, and then the mixture was stirred at 80° C. for 24 h. The solution was poured into 80 mL of methanol to produce a precipitate, which was filtered and rinsed several times with methanol. The obtained solid was then dried at 80° C. for 24 h in a vacuum to produce a dark purple powder (0.336 g, yield 93%).

Conversion of pre-PBO to PBO 1 g of the pre-PBO was weigh out and heated at 300° C. in an annealing oven under a $N_2$ atmosphere for 6 h to ensure complete conversion to PBO.

Conversion of pre-PBO to PBO using 8 nm $Au_{39}Pd_{61}$/C

The 8 nm $Au_{39}Pd_{61}$/C (2.5 mol %) was used to catalyze FA-induced reduction of 1,5-diisopropoxy-2,4-dinitrobenzene and subsequent condensation with terephthalaldehyde in NMP to form poly(p-phenylene-(4,6-diisopropoxy-1,3-phenylene) diethanimine), denoted as pre-PBO in the schematic below, which was further subject to heating treatment at 300° C. under a $N_2$ atmosphere for 6 h to remove isopropyl groups and to promote ring closure for the formation of PBO (FIG. 3).

Thermal gravimetric analysis (TGA) under a $N_2$ atmosphere showed that the pre-PBO has a weight loss of 25.7%, which agrees well with the calculated weight loss of 27.3% for the pre-PBO/PBO conversion (FIG. S5). IR spectra of the newly prepared pre-PBO and PBO show characteristic benzoxazole C=N, C—N, and C—O vibration peaks at approximately 1620, 1360, and 1054 $cm^{-1}$, respectively, which are similar to that of the commercial PBO, Zylon® (FIG. S6). UV-Vis absorption spectra taken in methane sulfonic acid solutions of PBO and Zylon® show the nearly identical absorption and photoluminescence (PL) peaks (FIG. S7), indicating the highly aromatic nature and conjugated structure of alternating benzoxazole and phenyl rings within PBO and Zylon® (36). The two split absorption peaks of 404 nm and 428 nm for PBO are induced by intermolecular interactions, consistent with that of the Zylon® sample (37). A more interesting aspect of this reaction is that the degree of polymerization is dependent on the size of the AuPd NPs. Among 4, 6, 8 and 10 nm AuPd NPs tested, pre-PBO was formed with a molecular weight ($M_w$) of 2.1, 2.4, 3.6 and 3.0 kDa, respectively, as measured by gel permeation chromatography (GPC) (FIG. S8). The 8 nm NPs induced the highest degree of polymerization in the one-pot reaction process. ICP-AES measurements show that the PBO synthesized using our method is metal- and PA-free. As a comparison, Zylon® contains 0.5% (by weight) of P, which means that there is one PA group for every ~25 repeating PBO units.

Stability test of the PBO and Zylon® at room temperature

The PBO (100 mg) and Zylon® (100 mg) was immersed in different solvents (10 mL) and stored at room temperature for a month. After that, the solid was filtered and dried at 80° C. for 24 h under vacuum.

Stability test of the PBO and Zylon® in boiling water

The PBO (100 mg) and Zylon® (100 mg) was boiled in water at 100° C. for 5 days. After that, the solid was filtered and dried at 80° C. for 24 h under vacuum.

Fabrication of PBO films

The PBO or Zylon® (500 mg) was dissolved in methanesulfonic acid at 80° C. for 5 h. The solution was then cast on a glass substrate to obtain a thin film, which was dried at 80° C. for 3 h and 130° C. for 3 h. The film was peeled off the glass substrate by immersing the substrate in water. The obtained film was dried at 80° C. for 12 h under vacuum for further mechanical tests.

Characterization

Samples for transmission electron microscopy (TEM) and high-resolution TEM (HRTEM) analyses were prepared by depositing a single drop of diluted NP dispersion/suspension on amorphous-carbon-coated copper grids. Images were obtained by a JEOL 2010 TEM (200 kV). TEM with a field-emission electron source and scanning TEM analyses were obtained on a Hitachi HD2700C (200 kV) with a probe aberration correction at Brookhaven National Laboratory. X-Ray powder diffraction (XRD) patterns of the samples were collected on a Bruker AXS D8-Advanced diffractometer with Cu Kα radiation ($\lambda$=1.5406 Å). The compositions of the NPs were measured by inductively coupled plasma-atomic emission spectroscopy (ICP-AES). For ICP-AES analyses, the dried NPs were dissolved in warm aqua regia (~70° C., 30 min) to ensure the complete dissolution of metal into the acid. The solution was then diluted with 2% $HNO_3$ solution. The measurements were carried out on a JY2000 Ultrace ICP-AES equipped with a JY-AS 421 auto sampler and 2400 g/mm holographic grating. The analyses of products after tandem reactions were carried out by GC-MS using an Agilent 6890 GC coupled to a 5973 mass spectrometer detector with a DB-5 (Agilent) fused silica capillary column (L×I.D. 30 m×0.25 mm, df 0.25 μm) and helium as carrier gas. The gas chromatograph was temperature programmed from 65° C. (3 min initial time) to 300° C. at 6° C. $min^{-1}$ (isothermal for 20 min final time). The mass spectrometer was operated in the electron impact mode at 70 eV ionization energy. Mass spectrometric data were acquired and processed using the GC-MS data system (Agilent Chemstation), and compounds were identified by gas chromatographic retention index and mass spectrum comparison with authentic standards, literature and library data, and unknown compounds were characterized by interpretation of the fragmentation pattern of their mass spectra. A TGA/DSC 1 STARe System from Mettler Toledo provided with a horizontal balance was used to measure the thermal stability. Approx. 10 mg of sample was placed in an alumina pan and heated from 100 to 900° C. or 300 to 900° C. with an 80 mL/min nitrogen purge and heating rate of 10° C./min. The change in weight was continuously registered. The tensile strength of sample films was tested with a constant span length of 5 cm using upper/lower grips (Instron 2714-006) on an Instron 5942 load frame. Load was applied by moving the crosshead at a rate of 0.1 mm/min while measuring the force with a 500 N load cell (Instron 2580-105). The tensile strength was evaluated from the breaking load, the width of the specimen, and its thickness. Gel permeation chromatography (GPC) was performed using an Agilent 1260 equipped with two Poroshell 120 EC-C18 columns heated at 35° C. (4.6×100 mm, 2.7 μm) and a UV-Vis Diode-array detector (DAD) and refractive (RI) detector. The eluant was inhibitor-free THF, and the system was calibrated with standard polystyrene standards ranging from 580-1,500,000 Da. UV-Vis absorption spectra were measured using an Agilent Technologies Cary 5000 UV-Vis Spectrophotometer. PBO samples were dissolved in methanesulfonic acid (MSA) (concentration: $7\times10^{-6}$ g/mL) for the measurements. The solution PL measurements were performed on an Edinburgh Instruments Fluorescence Spectrometer FS5. The samples were dissolved in MSA for measurements. The PL measurements were employed with excitation at 335 nm for monomer and 365 nm for dimer, tetramer, PBO and Zylon®.

Hydrolysis and Ring Opening of Benzooxazole catalyzed by phosphoric acid

Commercial PBOs or Zylon®, are made by condensing diaminobenzene diol and terephthalic acid with polyphosphoric acid as both solvent and catalyst. As a result, they are inevitably contaminated with phosphoric acid (PA) units. Extensive studies on PBO stability have revealed that these PA units catalytically hydrolyze the benzoxazole ring upon exposure to humid and lighted environments, causing unexpected and fast degradation of the mechanical integrity of the polymer fibers, as depicted below:

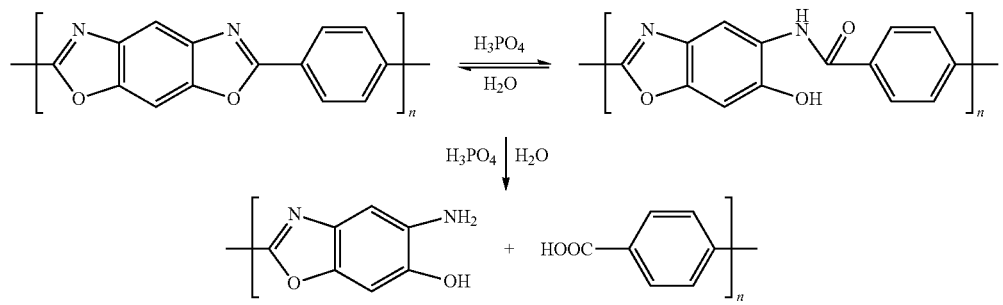

Comparing PBO Stability to Zylon® Stability

Stability of PBO and Zylon® were tested by exposing them to different environmental conditions and measuring their thermal and mechanical stability changes. Thermal stability of the PBO and Zylon® powders were assessed using TGA under a $N_2$ atmosphere (FIGS. 4A-C). PBO ($M_w$=3.6 kDa) displays an onset decomposition temperature at 600° C., whereas Zylon® ($M_w$=40 kDa) has it at 650° C. After immersion in water or DMSO under ambient conditions for a month, the Zylon® sample had a significantly reduced (35° C. or 45° C. decrease) onset decomposition temperature, whereas our PBO remained fairly constant (only 16° C. or 14° C. decrease) (FIG. 4A). After the samples were immersed in boiling water for 5 days, the onset decomposition temperature of Zylon® was reduced to 500° C., while the PBO was at 570° C. (FIG. 4B). The difference in PBO and Zylon® thermal stability was also observed in 5% ($T_5$) and 20% ($T_{20}$) mass loss temperatures. Zylon® suffered a significant depression of $T_5$ (587° C.) and $T_{20}$ (689° C.) than the PBO ($T_5/T_{20}$ at 635° C./693° C.). Tensile stress measurements on 7.6 μm thick PBO and 10.5 μm thick Zylon® films revealed that the Zylon® film was subject to a larger stress change than the PBO one after immersion in boiling water, and after 10-days of immersion in boiling water, the PBO film retained higher mechanical stress (20 MPa) than the Zylon® one (16 MPa) (FIG. 4C and the inset).

We claim:

1. A process of using an alloy nanoparticle catalyst to catalyze one pot chemical reactions for synthesizing functional polymers with controlled polymerization and properties, said process comprising:
   (a) contacting, in a neutral atmosphere, a solution of 1,5-diisopropoxy-2,4-dinitrobenzene with terephthalaldehyde, formic acid, and a nanoparticle catalyst to form a mixture;
   (b) stirring said mixture at an elevated temperature ranging from about 60° C. to about 90° C. from about 20 h to about 24 h;
   (c) forming a precipitate by mixing said stirred solution with methanol;
   (d) collecting said precipitate, in the form of a solid, and washing said collected precipitate with methanol;
   (e) subjecting said collected precipitate to an atmosphere of reduced pressure from about 20 hours to about 30 hours at a temperature of from about 60° C. to 90° C. to yield a pre-polybenoxazole as a dark colored powder; and
   (f) heating said pre-polybenoxazole PBO at a temperature of about 250° C. to about 350° C. in an inert atmosphere from about 5 hours to about 7 hours to yield polybenoxazole.

2. A process of claim 1, wherein the neutral atmosphere consists of a gas that is not capable of participating or affecting the outcome of the one-pot chemical reaction.

3. A process of claim 2 wherein the nanoparticle catalyst is an AuPd nanoparticle system.

4. A process of claim 3 wherein the neutral atmosphere essentially consists of a gas selected from nitrogen and argon.

5. A process of claim 3 wherein the AuPd nanoparticle system is a catalyst having a particle size of 8 nm.

6. A process of claim 5 wherein said mixture is stirred for 24 hours at about 80° C.

7. A process of claim 6 wherein said collected precipitate is subjected to an atmosphere of reduced pressure for about 24 hours at a temperature of about 80° C. to yield a pre-polybenoxazole as a dark colored powder.

8. A process of claim 7 wherein said pre-polybenoxazole is heated in an annealing oven at a temperature of about 300° C. in a Nitrogen atmosphere for polybenoxazole formation.

9. A process of claim 1 wherein the nanoparticle catalyst is an AuPd/C nanoparticle consisting of an AuPd nanoparticle catalyst on a carbon support.

10. A process of claim 9 wherein the AuPd catalyst particle size is selected from the group consisting of about 4 nm, about 6 nm, about 8 nm and about 10 nm.

11. A process of claim 10 wherein the AuPd catalyst particle size is 8 nm.

12. A process of claim 11 wherein said mixture is stirred for 24 hours at about 80° C.

13. A process of claim 12 wherein said collected precipitate is subjected to an atmosphere of reduced pressure for about 24 hours at a temperature of about 80° C. to yield a pre-polybenoxazole as a dark colored powder.

14. A process of claim 13 wherein said pre-polybenoxazole is heated in an annealing oven at a temperature of about 300° C. in a Nitrogen atmosphere for about 6 hours to yield polybenoxazole.

15. A process of using an AuPd nanoparticle catalyst to catalyze one pot chemical reactions for synthesizing functional polymers with controlled polymerization and properties, said process comprising:
(a) contacting, in a nitrogen atmosphere, a solution of 1,5-diisopropoxy-2,4-dinitrobenzene with terephthalaldehyde, formic acid, and a nanoparticle catalyst to form a mixture;
(b) stirring said mixture at about 80° C. for about 24 hours;
(c) forming a precipitate by mixing said stirred solution with methanol;
(d) collecting said precipitate, in the form of a solid, and washing said collected precipitate with methanol;
(e) subjecting said collected precipitate to an atmosphere of reduced pressure for about 24 hours at a temperature of about 80° C. to yield a pre-polybenoxazole as a dark colored powder; and
(f) heating said pre-polybenoxazole at about 300° C. in an annealing oven under a Nitrogen atmosphere for about 6 hours to yield polybenoxazole.

* * * * *